United States Patent
Davis, Jr. et al.

[11] Patent Number: 6,155,061
[45] Date of Patent: Dec. 5, 2000

[54] METHOD OF DETERMINING WINDSHIELD FOGGING BASED ON INFERENCE FROM PRESENCE OF RAIN

[75] Inventors: Leighton Ira Davis, Jr., Ann Arbor; John David Hoeschele, Detroit; Gerhard Allen Dage, Franklin, all of Mich.

[73] Assignee: Ford Motor Company, Dearborn, Mich.

[21] Appl. No.: 09/472,085

[22] Filed: Dec. 23, 1999

[51] Int. Cl.$^7$ ........................................ F29B 49/02
[52] U.S. Cl. ................ 62/176.6; 62/133; 165/204; 165/230; 236/44 C; 236/91 C; 454/75
[58] Field of Search .................. 62/133, 176.1, 62/176.2, 176.5, 176.6, 244; 165/204, 222, 224, 230, 42, 43; 236/44 A, 44 R, 44 C, 91 C, 49.3; 454/75

[56] References Cited

U.S. PATENT DOCUMENTS

| | | | |
|---|---|---|---|
| 4,107,941 | 8/1978 | Hamilton | 62/186 |
| 4,424,933 | 1/1984 | Sutoh et al. | 236/44 A |
| 4,895,000 | 1/1990 | Takahashi | 62/176.3 |
| 4,896,589 | 1/1990 | Takahashi . | |
| 4,920,755 | 5/1990 | Tadahiro . | |
| 5,346,129 | 9/1994 | Shah et al. . | |
| 5,355,323 | 10/1994 | Bae | 236/44 R |
| 5,516,041 | 5/1996 | Davis, Jr. et al. | 236/49.3 |
| 5,806,763 | 9/1998 | Jones | 236/44 C |
| 5,850,968 | 12/1998 | Jokinen | 236/44 C |
| 5,931,006 | 8/1999 | Straub et al. | 62/176.6 X |
| 5,971,066 | 10/1999 | Oehring et al. | 165/202 |

FOREIGN PATENT DOCUMENTS

| | | |
|---|---|---|
| 57-175412 | 10/1982 | Japan . |
| 61-220907 | 10/1986 | Japan . |
| 6-147598 | 5/1994 | Japan . |

*Primary Examiner*—Harry B. Tanner
*Attorney, Agent, or Firm*—Charles H. Ellerbrock

[57] ABSTRACT

A method is provided of determining windshield fog secondary for automatically controlling a heating, ventilation and air conditioning (HVAC) system of a vehicle. The method includes the steps of determining whether rain is occurring on a windshield of a vehicle, determining a windshield parameter as a function of the rain occurring and determining a temperature difference based on temperature within a cabin of the vehicle and ambient temperature. The method also includes the steps of determining a fog boundary based on the windshield parameter and temperature difference, determining a relative humidity based on the windshield parameter and the temperature difference and fog boundary and determining a fog probability based on the fog boundary relative humidity and a nominal base relative humidity for rain conditions. The method further includes the steps of determining anti-fog actions to be taken based on the fog probability and taking the anti-fog actions determined to control the HVAC system.

20 Claims, 5 Drawing Sheets

Control action taken, based on proximity to fog
boundary (represented in fog probability)

METHOD OF DETERMINING WINDSHIELD FOGGING BASED ON INFERENCE FROM PRESENCE OF RAIN

BACKGROUND OF THE INVENTION

1. Field of the Invention

The present invention relates generally to methods of controlling a heating, ventilating and air conditioning (HVAC) system of a vehicle and, more specifically, to a method of determining windshield fogging for a HVAC system in a vehicle based on an inference from a presence of rain.

2. Description of the Related Art

It is known that a fundamental goal of a HVAC system for a vehicle is to detect and avoid windshield/window fogging conditions. In an attempt to measure and control the many variables that affect fogging, modern HVAC systems have many sensors and control actuators. A typical HVAC system might have a temperature sensor inside a cabin or occupant compartment of the vehicle, one measuring ambient temperature outside and others measuring various temperatures of the HVAC system internal workings. The occupant may have some input to the HVAC system via a set point or other adjustment. Additional sensors measuring sun heating load, humidity, etc. might be available to the HVAC system. The set of actuators might include a variable speed blower, some means for varying air temperature—including cooling and thereby extracting moisture from the air, ducting and doors to control the direction of air flow and the ratio of fresh to recirculated air.

It is known how to provide a method and control system for controlling the HVAC system to prevent windshield fogging. Such a method and control system is disclosed in U.S. Pat. No. 5,516,041 to Davis, Jr. et. al., the disclosure of which is hereby incorporated by reference. In this patent, the method and control system uses fuzzy logic to prevent windshield fogging. The control system responds to signals generated by various climate control sensors including a humidity sensor to produce a desired vehicle air temperature and air flow to detect and avoid incipient windshield/window fog conditions. Fuzzy logic and calculations are performed based on fuzzy rules and membership functions to provide nonlinear compensation.

Although the above process has worked well, it is desirable to provide a method for determining the appropriate climate control system action s to take to avoid windshield fogging or misting given the presence of rain. It is also desirable to provide a strategy of windshield de-mist based on an inference from the presence of rain. I t is further desirable to provide an auto-demist strategy based on cabin humidity sensing without using a humidity sensor. Therefore, there is a need in the art to provide a method that accomplishes these desires.

SUMMARY OF THE INVENTION

Accordingly, the present invention is a method of determining the windshield fog boundary for automatically controlling a heating, ventilation and air conditioning (HVAC) system of a vehicle. The method includes the steps of determining whether rain is occurring on a windshield of a vehicle, determining a windshield parameter as a function of the rain occurring and determining a temperature difference based on temperature within a cabin of the vehicle and ambient temperature. The method also includes the steps of determining a fog boundary relative humidity based on the windshield parameter and temperature difference, and determining a fog probability based on the difference between the fog boundary relative humidity and the inferred cabin relative humidity. The method further includes the steps of determining anti-fog actions to be taken based on the fog probability and taking the anti-fog actions determined to control the HVAC system.

One advantage of the present invention is that a method of windshield de-mist or de-fogging based on an inference from the presence of rain is provided for an HVAC system of a motor vehicle. Another advantage of the present invention is that the method determines the appropriate climate control system actions to take to avoid windshield fogging or misting given the presence and intensity of rain determined from a rain sensor or processing wiper signals. Yet another advantage of the present invention is that the method alters climate control actions upon detecting rain conditions to avoid windshield fogging. Still another advantage of the present invention is that the method provides windshield de-mist by inferring baseline cabin humidity from knowledge of the presence of rain, but without using a humidity sensor.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
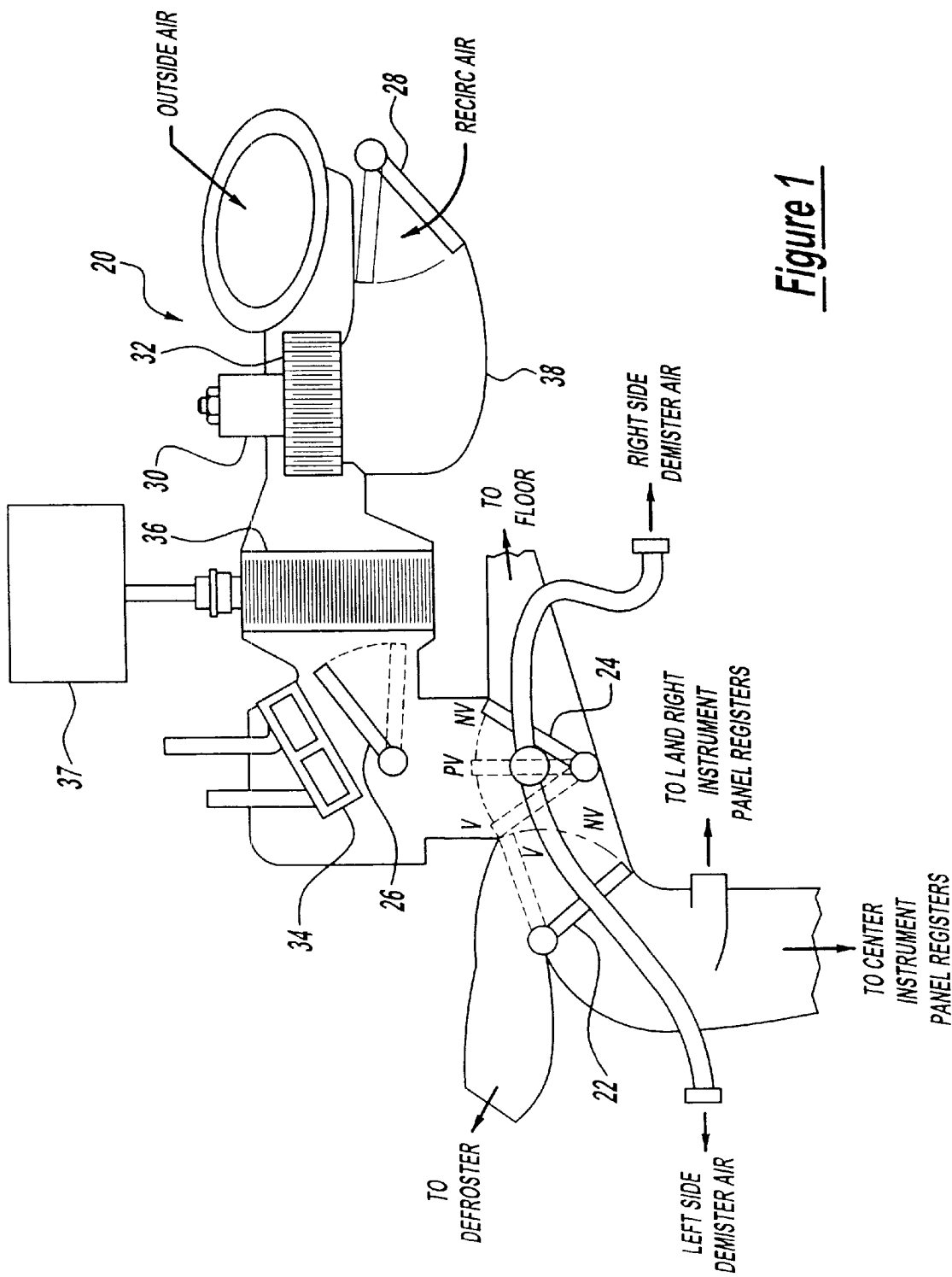
FIG. 1 is a diagrammatic view of a heating, ventilating, air conditioning (HVAC) system which can be controlled by a method, according to the present invention, of determining windshield fogging for the HVAC system.

Referring to the drawings and in particular FIG. 1, one embodiment of an air handling system of a heating, ventilation and air conditioning (HVAC) system 20 for a vehicle (not shown) is illustrated. In general, control of air temperature and air flow (and, to a lesser extent, humidity) within a cabin or occupant compartment of the vehicle is accomplished using various actuators to affect the temperature and flow of air supplied to the cabin of the vehicle. The HVAC system 20 includes an arrangement of air flow doors, including panel-defrost, floor-panel, temperature blend and outside recirculated air actuators or doors 22, 24, 26 and 28, respectively. The doors 22 and 24 are preferably driven by vacuum motors (not shown) between their various vacuum, partial vacuum and no vacuum positions in a conventional manner as illustrated in FIG. 1. The door 26 is driven by an electric servo motor (not shown) also in a conventional manner. The door 28 may also be driven by an electric servo motor so that the position of the door 28 is continuously variable.

The HVAC system 20 also includes a variable speed blower motor or fan 30 including a blower wheel 32. The HVAC system 20 includes heating and cooling elements such as a heater core 34 and an evaporator core 36 in a typical vehicle air conditioning plant including a compressor 37. Each of the above components is in communication with the HVAC case and associated ducting 38 in order to control temperature, the direction of air flow and the ratio of fresh or intake air to recirculated air.

For automatic control of the temperature and flow of air in the cabin, conditions within and outside the cabin are monitored by sensors and an electronic controller generates signals to control the plant actuators according to the conditions as indicated by the sensors. The evaporator temperature is controlled in a conventional automatic fashion to allow the HVAC system 20 to dehumidify air moving thereover.

Figure 2:
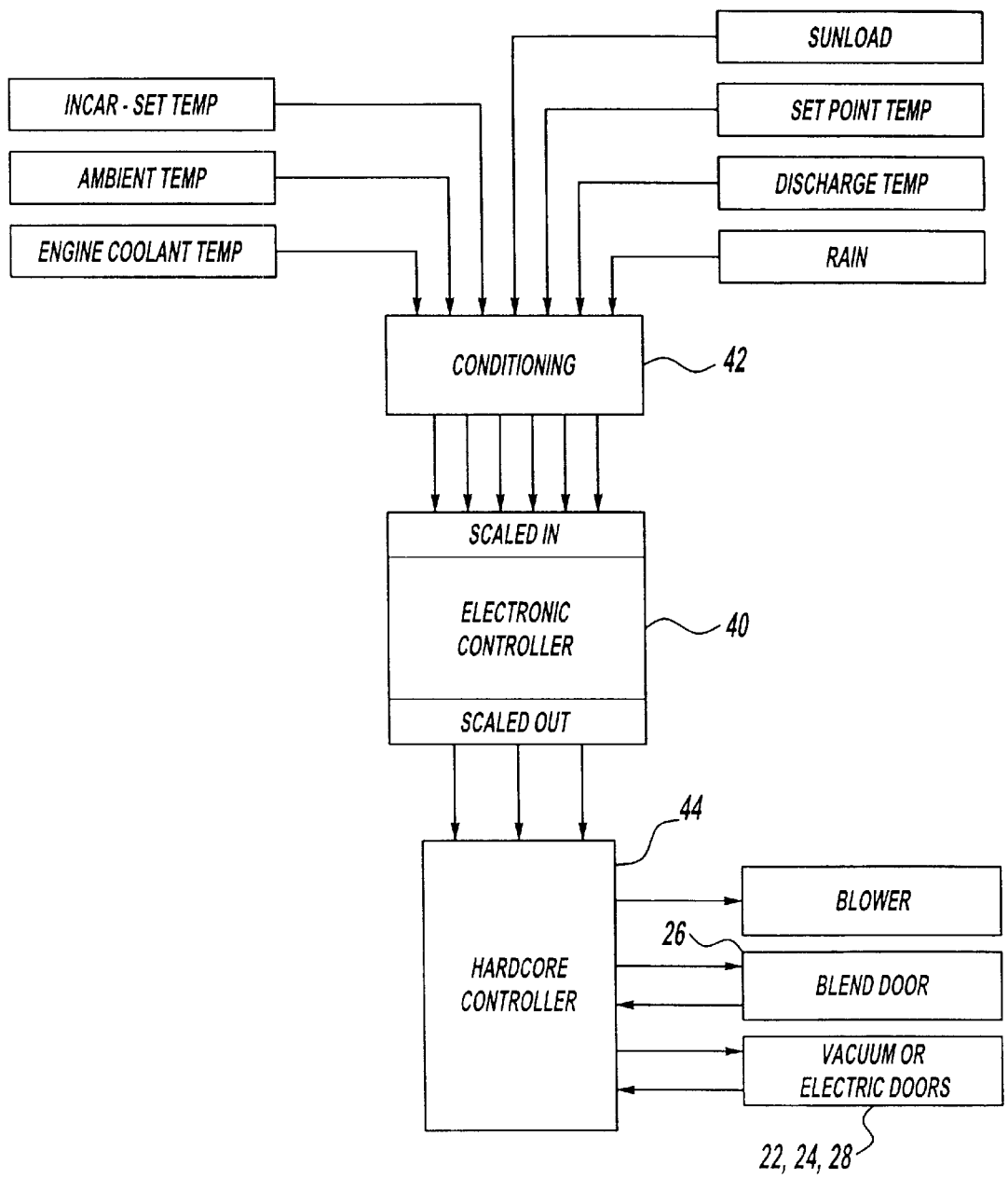
FIG. 2 is a schematic block diagram of a control System used to carry out a method, according to the present invention, of determining windshield fogging for the HVAC system of FIG. 1.

As illustrated in FIG. 2, a typical complement of sensors of the HVAC system 20 provide signals which are representative of interior (in-car) air temperature, ambient (outside) air temperature, engine coolant temperature (ECT), vehicle speed (VS), rain intensity, discharge air temperature and sunload. In addition, there is a set signal or set temperature value indicating the desired temperature that is set manually by the operator of the vehicle.

The signals are provided to an electronic controller 40 as inputs after being conditioned by a conditioning circuit 42. The electronic controller 40 scales the input signals and provides scaled output signals for use by a hardware controller 44 which, in turn, controls the doors 22 through 28 and the blower 32 to regulate the temperature and flow of air and ultimately to prevent fogging of a window pane or windshield (not shown) of the vehicle. The position of the blend door 26 is fed back to the hardware controller 44 as indicated by a return arrow. The hardware controller 44 also receives signals from the ignition switch (not shown) and the HVAC system 20 to indicate the operating of the ignition switch and HVAC system 20. The hardware controller 44 preferably continually monitors the state of the ignition switch and the state of the HVAC system 20. It should be appreciated that the HVAC system 20 is similar to that disclosed in U.S. Pat. No. 5,516,041 to Davis, Jr. et al., the disclosure of which is hereby incorporated by reference.

A method, according to the present invention, considers the implications of rain on an anti-fog strategy for the windshield of the vehicle and what may be inferred in the absence of a humidity sensor. Information that rain is occurring can be provided from a rain sensor (not shown) directly or from a wiper signal from a wiper motor (not shown) continuing for a sufficient time that rain may be inferred. There are two inferences that can be made given the presence of rain: that the exterior humidity is undoubtedly higher than otherwise, e.g., within a certain range; and that the windshield temperature is lower than usual. Both have implications on the likelihood of windshield fogging.

A fog boundary defines the transition from conditions not likely to produce fog (misting) on the windshield to those (worst case) conditions that will most likely lead to fogging. The fog boundary is mapped as a curve that gives relative humidity (rh) for incipient windshield fogging as a function of cabin temperature and ambient temperature. Below the fog boundary, fogging of the windshield or window is unlikely. At or just above the fog boundary, fogging of the windshield or window is likely to occur under worst case conditions. Well above the fog boundary, fogging of the windshield or window will prevail except perhaps for those portions of the windshield where air movement is high. A variable called fog probability ($P_{fog}$) is defined that starts at zero well away from the fog boundary, starts to rise as the humidity comes within some distance of the boundary, and equals 100% as the fog boundary is crossed (it is allowed to go further to some maximum value to allow continued increase in action in cases of extreme fogging).

The fog boundary is given as an equation, expressing the inside relative humidity for incipient fog conditions as a function of a single variable, $T_{in}-T_{amb}$, wherein $T_{in}$ is the cabin interior temperature and $T_{amb}$ is the ambient temperature, and a single parameter, $F_w$. $F_w$ is defined in terms of the windshield interior surface temperature $T_w$ as follows:

$$T_W = T_{amb} + F_w(T_{in} - T_{amb}) \qquad (1)$$

Figure 3:
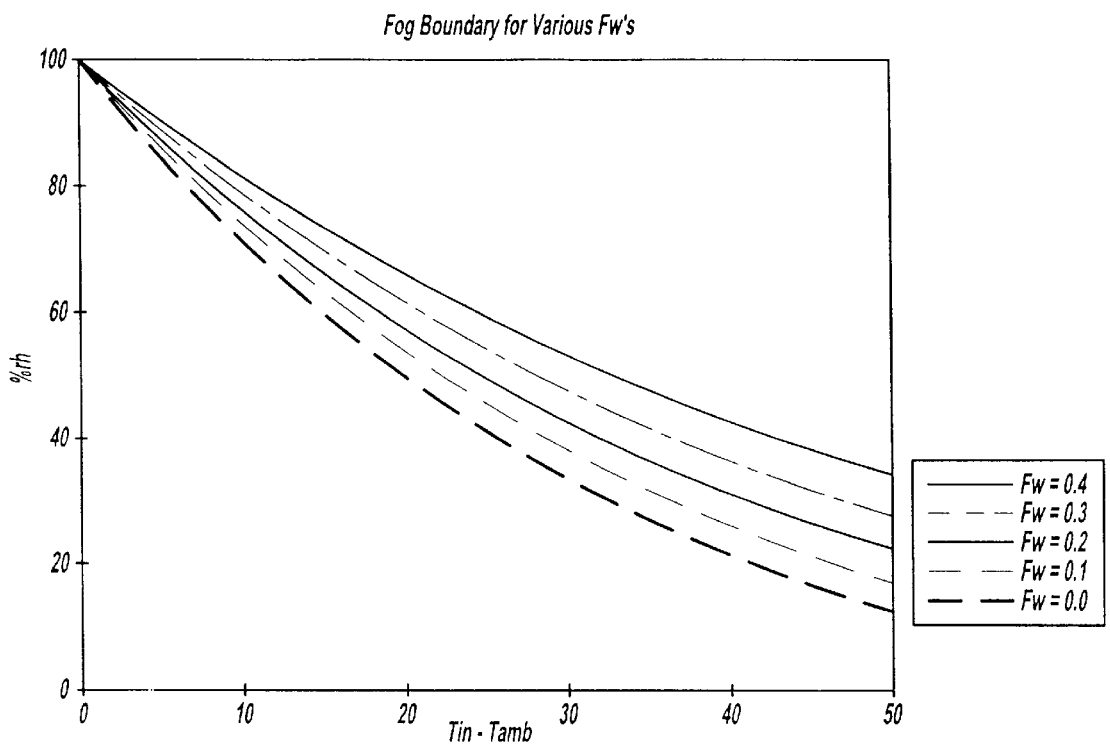
FIG. 3 is a graph of the fog boundary for various fractions Fw for a method, according to the present invention, of determining windshield fogging for the HVAC system of FIG. 1.

$T_w$ is expressed as the ambient temperature plus a fraction, $F_w$ of the difference between the inside or interior temperature and the outside or ambient temperature, $T_{in}-T_{amb}$. The parameter $F_w$ may be determined in the absence of humidity measurements or any fogging, the only provision being that the windshield inner surface temperature should be measured under what would, the presence of humidity aside, be worst case fogging conditions. Plots of the fog boundary for various values of $F_w$ are shown in FIG. 3.

For incipient fog to occur, $T_w$ must be equal to the dew point of the air adjacent to the windshield, which in worst case is the same as the dew point of the air in the cabin, $$T_w = T_{dp} = f(T_{in}, rh_{in}) \qquad (2)$$

which in turn is related to the inside temperature ($T_{in}$) and humidity ($rh_{in}$). In general, the two dimensional mapping given by $f(T_{in}, rh_{in})$ is somewhat complicated, but may be simplified by noting that $T_{dp}$ and $T_{in}$ coincide at 100% relative humidity, by definition. To rearrange the expression, subtract $T_{dp}$ from $T_{in}$ and cast f in terms of $100-rh_{in}$, yielding a different function, g as follows:

$$T_{in} - T_{dp} = g(T_{in}, 100 - rh_{in}) \qquad (3)$$

As a result of this rearrangement, the series of curves of $T_{in}-T_{dp}$ vs. $100-rh_{in}$ converge at the origin. The variation of these curves with $T_{in}$ is not great, especially considering that $T_{in}$ will be near room temperature most of the time. This relationship may be approximated with one curve, of one variable, as follows:

$$T_{in} - T_{dp} = h(100 - rh_{in}) \qquad (4)$$

wherein h is monotonic, thus there is no problem inverting it, at least in principle to yield:

$$100 - rh_{in} = h(T_{in} - T_{dp}) \qquad (5)$$

Recalling that for incipient fogging, $T_w = T_{dp}$, substituting equation (1) into equation (5) yields:

$$100 - \text{rh}_{in} = h^{-1}[T_{in} - T_{amb} - F_w(T_{in} - T_{amb})]$$

or $$\text{rh}_{in} = 100 - h^{-1}[(1 - F_w)(T_{in} - T_{amb})] \qquad (6)$$

This equation, assuming $h^{-1}$ can be found, gives the inside relative humidity for incipient fog conditions under worst case conditions; that is, it gives the incipient fog boundary curve discussed above. It should be appreciated that equation (6) is a great simplification in that the humidity is a function of a single variable, $T_{in} - T_{amb}$. It should also be appreciated that the function h relates to the properties of moist air only and the properties of the vehicle are subsumed into a single parameter, $F_w$. This parameter $F_w$ may be determined in the absence of humidity measurements or any fogging, the only provision being that the windshield inner surface temperature $T_w$ should be measured under what would be worst case fogging conditions as discussed above.

Given the ability to detect incipient fog conditions, and a measure of the degree or likelihood of windshield fogging via fog probability, a strategy may be established for avoiding these conditions. As fog probability increases, the speed of the blower 32 is increased proportionally. At some low threshold, the air conditioning (A/C) clutch (not shown) is turned on, if it is not already; likewise, the fresh/recirculation door 28 is put in fresh mode. At an intermediate fog probability, for example 50%, the air distribution mode is changed to put more discharge air on the windshield. If the current mode is floor, floor/defrost mode is chosen; if the current mode is floor/defrost or any other, defrost mode is chosen. At a high threshold of fog probability, for example 90%, the defrost air distribution mode is chosen exclusively. The use of increased blower and more windshield-directed modes can be quite effective for alleviating windshield fog without affecting comfort. However, above 100% fog probability, the blower 32 continues to ramp up strongly and heat is added to the strategy.

Figure 4:
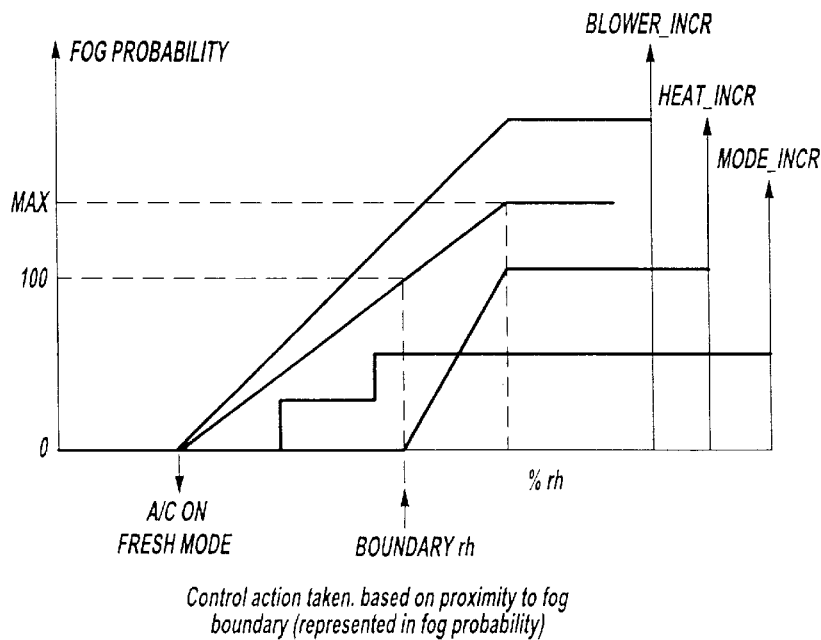
FIG. 4 is a graph of fog probability versus cabin relative humidity for a method, according to the present invention, of determining windshield fogging for the HVAC system of FIG. 1.

As illustrated in FIG. 4, fog probability as a function of proximity of relative humidity (rh) to the fog boundary along with actions taken to modify the strategy is shown. Blower_incr and Heat_incr are variables added to the blower speed and system heat, respectively. Mode_incr bumps the air distribution to modes more directed at the windshield. The point at which the A/C clutch and fresh mode are assured is also indicated. In this manner, the degree of control action taken to counter windshield fogging is modulated according to fog probability. Beginning gradually, the control actions are increased with the severity of anticipated fogging condition. At the extreme, the actions taken are equivalent to the best countermeasures possible (short of rolling down the windows).

The ambient relative humidity when it is raining is naturally higher than usual, but it is rarely 100%. 100% relative humidity occurs usually with fog (or equivalent, cloud) and other than what might be called a very light rain or mist, is seldom accompanied by the sort of rain that would greatly affect heat flow from the windshield. On the other hand, it is also rare to see relative humidities less than 75% when it is raining. The ambient temperature range where windshield fogging usually occurs is from 30° F. to 50° F. The range of relative humidities for ambient air is from 75% to 95% and temperatures from 30° F. to 50° F. When brought into the cabin interior or occupant compartment of the vehicle, this air will be brought to a comfortable temperature, say 75° F. If no moisture is removed or added to the air, the absolute humidity will not change, but the relative humidity will decrease due to the air being warmer. When plotted on a typical fog boundary graph as illustrated in FIG. 5, the range of ambient humidities and temperatures falls onto a particular region in terms of fog probability.

Figure 5:
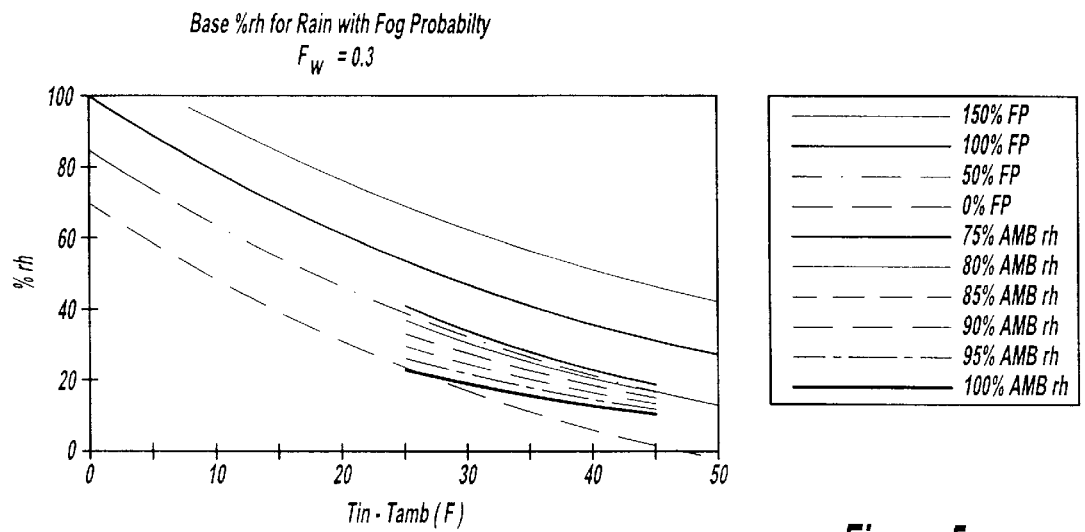
FIG. 5 is a graph of base percent relative humidity for rain with fog probability for a method, according to the present invention, of determining windshield fogging for the HVAC system of FIG. 1.

As illustrated in FIG. 5, the fog boundary is plotted for a $F_w$ value of 0.3. The patch of values transformed from likely conditions during rain includes values approaching 50% fog probability. If the A/C is on and the evaporator core temperature is 40° F., the range of ambient humidities and temperatures transforms to a somewhat different patch as illustrated in FIG. 6.

Figure 6:
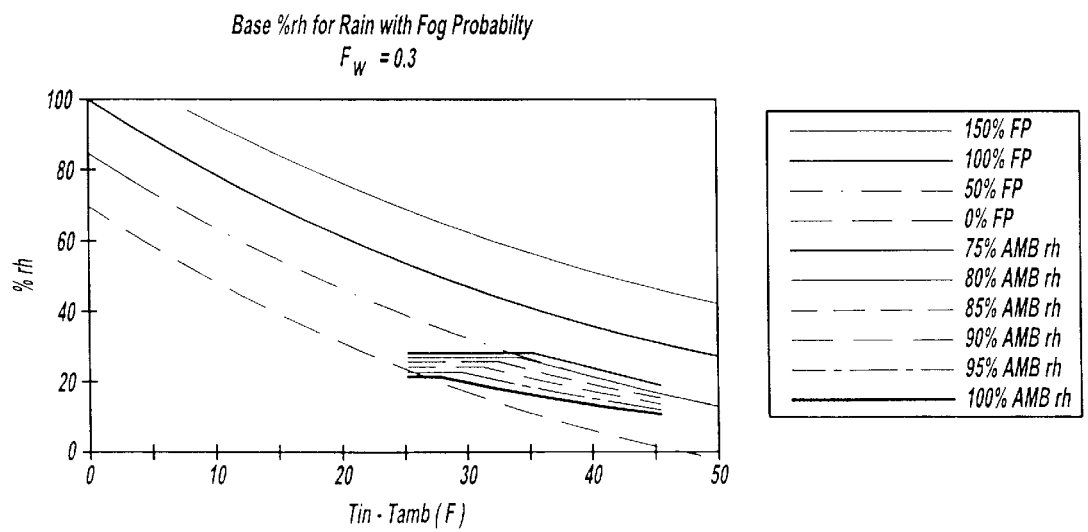
FIG. 6 is another graph of base percent relative humidity for rain with fog probability for a method, according to the present invention, of determining windshield fogging for the HVAC system of FIG. 1.

As illustrated in FIG. 6, it can be seen that the A/C helps, but a fog probability value of 40% is still possible, and other interior sources of humidity that would add to the interior values have not been considered. Interior sources, i.e., people, wet clothes, etc. would raise the humidity further from the levels indicated by this patch. The patch only represents baseline values for humidity and corresponding fog probability. It should be appreciated that a typical auto-demist strategy would already be taking fog avoidance actions.

The effect of rain on windshield fogging is not limited to merely indicating a higher ambient humidity. Rain drops penetrate the outer windshield boundary layer, directly affecting the heat transfer across the windshield. Additionally, the temperature of the rain drops is, in theory, less than that of the ambient air around them. Evaporation at the surface of the rain drops should cool them to the wet bulb temperature of the air they are falling through. This temperature depends on the humidity of the air, but for air at 50° F. and 75% rh, the wet bulb temperature is about 46° F., four degrees cooler. It should be appreciated that there are many uncertainties involved in determining rain's cooling effect on the windshield, but a worst case estimate is that a driving rain might lower $T_w$ to the ambient air temperature, i.e., $F_w = 0$. In this case, the fog boundary would be given as the lowest curve in FIG. 3. A driving rain would represent the worst case condition; as rain intensity decreases, $F_w$ should increase correspondingly, to the nominal (vehicle-specific, calibrated, no rain), value when no rain is present.

Figure 7:
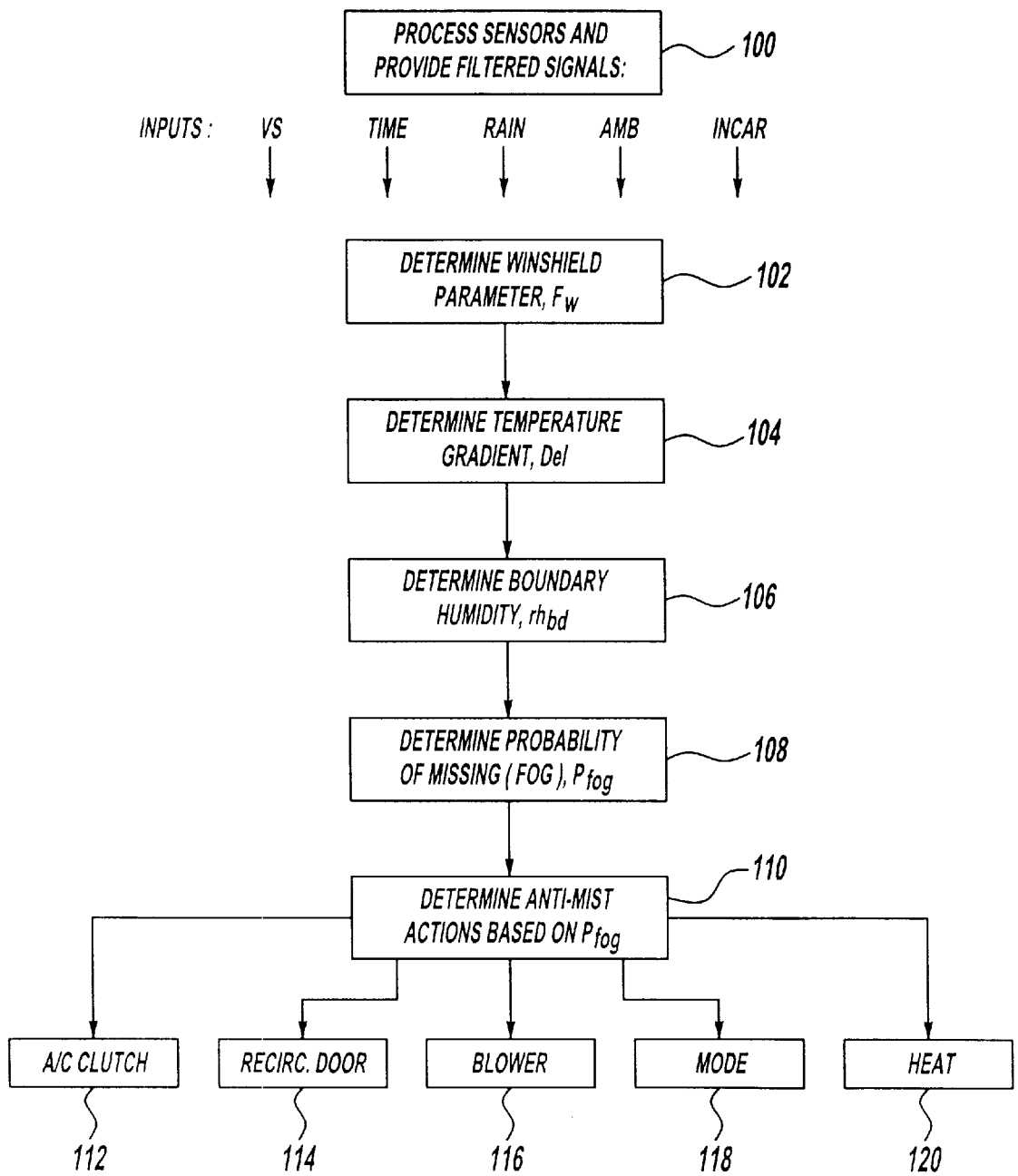
FIG. 7 is a flowchart of a method, according to the present invention, of determining windshield fogging for the HVAC system of FIG. 1.

Referring to FIG. 7, a method, according to the present invention, of determining windshield fog boundary is shown. In general, the method calculates the fog boundary based on the parameter $F_w$ according to the intensity of rain as determined by a rain sensor or speed of wiper action. In the absence of a cabin humidity sensor, a nominal rain relative humidity value (90%) is assumed and the method implements control actions appropriate to the situation inferred from the rain. It should be appreciated that the method is carried out on the electronic controller 40.

As illustrated in FIG. 7, the method begins in block 100 and processes signals from the sensors and provides filtered signals of vehicle speed (vs), time (t), rain intensity, ambient temperature ($T_{amb}$) and interior or in-car temperature ($T_{in}$). The method advances from block 100 to block 102 and determines $F_w$ either from a look-up table stored in memory or as an explicit function of rain intensity. From block 102, the method advances to block 104 and determines a temperature difference, Del, equal to $T_{in}$ minus $T_{amb}$. From block 104, the method advances to block 106 and determines the boundary relative humidity rhbd according to a look-up table stored in memory (corresponding to a graph as illustrated in FIG. 3) or explicitly via a function of $F_w$ and Del. The method then advances to block 108 and determines probability of misting (fog) ($P_{fog}$) according to a look-up table stored in memory (corresponding to the graphs in FIGS. 5 and 6) or explicitly as a function of the proximity of measured relative humidity to the fog boundary. The method then advances to block 110 and determines anti-fog actions based on $P_{fog}$. The method advances to one or more blocks 112,114,116,118,120 for activating the A/C clutch, recirculation door 28, blower 30, mode and heat based on the anti-fog action determined in block 110. The method then ends.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically Described.

What is claimed is:

1. A method of determining windshield fog boundary for automatically controlling a heating, ventilation and air conditioning (HVAC) system of a vehicle, said method comprising the steps of:

determining whether rain is occurring on a windshield of a vehicle;

determining a windshield parameter as a function of the rain occurring;

determining a temperature difference based on temperature within a cabin of the vehicle and ambient temperature;

determining a fog boundary based on the windshield parameter and temperature difference;

determining a relative humidity based on the windshield parameter and the temperature difference and fog boundary;

determining a fog probability based on the fog boundary relative humidity and a nominal base relative humidity for rain conditions;

determining anti-fog actions to be taken based on the fog probability; and taking the anti-fog actions determined to control the HVAC system.

2. A method as set forth in claim 1 wherein said step of determining whether rain is occurring is based on a signal from a rain sensor or a wiper motor for a predetermined period of time.

3. A method as set forth in claim 2 wherein said step of determining the windshield parameter is a function of vehicle speed, time and rain occurring.

4. A method as set forth in claim 3 wherein including the step of determining a fog boundary comprises calculating the fog boundary based on the ambient temperature ($T_{amb}$) and windshield parameter ($F_w$) and temperature difference ($T_{in}$-$T_{amb}$).

5. A method as set forth in claim 4 wherein said step of calculating the fog boundary according to the equation $rh_{bd}=100-h^{-1}[(1-F_w)(T_{in}-T_{amb})]$.

6. A method as set forth in claim 5 wherein said step of determining the anti-fog actions comprises determining whether to adjust blower speed, turn on the air conditioning, change an air distribution mode, adjust a fresh/recirculation air door, add heat or any combination of these actions.

7. A method as set forth in claim 6 wherein said step of taking the anti-fog actions comprises adjusting blower speed, turning on the air conditioning, changing an air distribution mode, adjusting a fresh/recirculation air door, or adding heat.

8. A method as set forth in claim 2 wherein said step of determining fog probability is based on the windshield parameter ($F_w$) and the temperature difference ($T_{in}$-$T_{amb}$) and a nominal base relative humidity for rain conditions.

9. A method as set forth in claim 8 wherein said fog probability is determined from a range of relative humidity approximately from 75% to 95% and temperature difference of approximately from 30° F. to 50° F.

10. A method of determining windshield fog boundary for automatically controlling a heating, ventilation and air conditioning (HVAC) system of a vehicle, said method comprising the steps of:

determining whether rain is occurring on a windshield of a vehicle;

determining a windshield parameter as a function of the rain occurring;

determining a temperature difference based on temperature within a cabin of the vehicle and ambient temperature;

calculating a fog boundary relative humidity based on the ambient temperature ($T_{amb}$) and the windshield parameter ($F_w$) and the temperature difference ($T_{in}$-$T_{amb}$);

determining a fog probability based on the fog boundary relative humidity and a nominal base relative humidity for rain conditions;

determining anti-fog actions to be taken based on the fog probability; and taking the anti-fog actions determined to control the HVAC system.

11. A method as set forth in claim 10 wherein said step of determining whether rain is occurring is based on a signal from a rain sensor or a wiper motor for a predetermined period of time.

12. A method as set forth in claim 11 wherein said step of determining the windshield parameter is a function of vehicle speed, time and rain occurring.

13. A method as set forth in claim 10 wherein said step of calculating the fog boundary according to the equation $rh_{bd}=100-h^{-1}[(1-F_w)(T_{in}-T_{amb})]$.

14. A method as set forth in claim 10 wherein said step of determining the anti-fog actions comprises determining whether to adjust blower speed, turn on the air conditioning, change an air distribution mode, adjust a fresh/recirculation air door, add heat, or any combination of these actions.

15. A method as set forth in claim 14 wherein said step of taking the anti-fog actions comprises adjusting blower speed, turning on the air conditioning, changing an air distribution mode, adjusting a fresh/recirculation air door, or adding heat.

16. A method as set forth in claim 10 wherein said step of determining fog probability is based on the windshield parameter ($F_w$) and the temperature difference ($T_{in}$-$T_{amb}$) and a nominal base relative humidity for rain conditions.

17. A method as set forth in claim 16 wherein said fog probability is determined from a range of relative humidity approximately from 75% to 95% and temperature difference of approximately from 30° F. to 50° F.

18. A method of determining windshield fog boundary for automatically controlling a heating, ventilation and air conditioning (HVAC) system of a vehicle, said method comprising the steps of:

determining whether rain is occurring on a windshield of a vehicle based on a signal from a rain sensor or a wiper motor for a predetermined period of time;

determining a windshield parameter as a function of the rain occurring;

determining a temperature difference based on temperature within a cabin of the vehicle and ambient temperature;

calculating a fog boundary on the ambient temperature ($T_{amb}$) and the windshield parameter ($F_w$) and the temperature difference ($T_{in}-T_{amb}$);

determining a relative humidity based on the windshield parameter and the temperature difference and fog boundary;

determining a fog probability based on the windshield parameter ($F_w$) and the temperature difference ($T_{in}-T_{amb}$) and a nominal base relative humidity for rain conditions;

determining anti-fog actions to be taken based on the fog probability; and taking the anti-fog actions determined to control the HVAC system.

19. A method as set forth in claim 18 wherein said step of determining the windshield parameter is a function of vehicle speed, time and rain occurring.

20. A method as set forth in claim 18 wherein said fog probability is determined from a range of relative humidity approximately from 75% to 95% and temperature difference of approximately from 30° F. to 50° F.

* * * * *